US007917966B2

(12) United States Patent
Kim et al.

(10) Patent No.: US 7,917,966 B2
(45) Date of Patent: Mar. 29, 2011

(54) ALIGNED NANOSTRUCTURES ON A TIP

(75) Inventors: Yong Hyup Kim, Seoul (KR); Wal Jun Kim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 189 days.

(21) Appl. No.: 12/196,194

(22) Filed: Aug. 21, 2008

(65) Prior Publication Data

US 2010/0047621 A1 Feb. 25, 2010

(51) Int. Cl.
*G01Q 70/12* (2010.01)
(52) U.S. Cl. ............... 850/58; 850/52; 850/56; 850/59; 850/60; 977/849; 977/860; 977/902; 977/947
(58) Field of Classification Search .............. 850/40, 850/23, 33, 41, 42, 52, 55, 56, 57, 58, 59, 850/60, 61; 977/700, 742, 743, 750, 752, 977/840, 849, 874, 947
See application file for complete search history.

(56) References Cited

U.S. PATENT DOCUMENTS

| 4,326,989 | A | 4/1982 | Colon et al. |
| 4,498,962 | A | 2/1985 | Oda et al. |
| 5,132,002 | A | 7/1992 | Kato |
| 6,635,311 | B1 | 10/2003 | Mirkin et al. |
| 6,743,408 | B2 | 6/2004 | Lieber |
| 7,014,749 | B2 | 3/2006 | Redepenning |
| 7,022,541 | B1 | 4/2006 | Yenilmez et al. |
| 7,045,947 | B2 | 5/2006 | Van Der Vaart et al. |
| 2002/0046953 | A1* | 4/2002 | Lee et al. ................ 205/104 |
| 2002/0182970 | A1 | 12/2002 | Liu et al. |
| 2003/0157254 | A1* | 8/2003 | Mirkin et al. ............ 427/372.2 |
| 2004/0173378 | A1* | 9/2004 | Zhou et al. .................. 174/260 |
| 2005/0272885 | A1* | 12/2005 | Mirkin et al. ............... 526/72 |
| 2007/0007142 | A1 | 1/2007 | Zhou et al. |
| 2007/0014148 | A1 | 1/2007 | Zhou et al. |
| 2007/0025907 | A1 | 2/2007 | Rezeq et al. |
| 2007/0082459 | A1* | 4/2007 | Faris ........................ 438/455 |
| 2007/0221840 | A1 | 9/2007 | Cohen et al. |
| 2008/0280137 | A1* | 11/2008 | Ajayan et al. ............. 428/375 |
| 2009/0173931 | A1* | 7/2009 | Stumbo ...................... 257/14 |
| 2009/0272935 | A1* | 11/2009 | Hata et al. ................... 252/70 |
| 2010/0068406 | A1* | 3/2010 | Man ........................... 427/469 |

FOREIGN PATENT DOCUMENTS

EP 1061041 A1 12/2000

(Continued)

OTHER PUBLICATIONS

Stanislaus Wong, et al., Single-walled carbon nanotube probes for high-resolution nanostructure imaging, Applied Physics Letters, vol. 73, No. 23, pp. 3465-3467, Dec. 7, 1998 American Institute of Physics.

(Continued)

*Primary Examiner* — David A Vanore
*Assistant Examiner* — Nicole Ippolito Rausch
(74) *Attorney, Agent, or Firm* — Knobbe, Martens, Olson & Bear, LLP

(57) ABSTRACT

Techniques for fabricating carbon nanotubes aligned on a tip are provided. In one embodiment, a method for fabricating carbon nanotubes aligned on a tip includes forming nanostructures on the tip, and aligning the nanostructures on the tip using a fluid flowing on the tip.

15 Claims, 15 Drawing Sheets

FOREIGN PATENT DOCUMENTS

| | | |
|---|---|---|
| JP | 2004211213 A | 7/2004 |
| WO | WO 2005/025734 A2 | 3/2005 |

OTHER PUBLICATIONS

Hongjie Dai, et al., Naontubes as nanoprobes in scanning probe microscopy, Nature, vol. 384, pp. 147-150, Nov. 14, 1996 Nature Publishing Group.

Ji-Eun Kim, et al., Use of dielectrophoresis in the fabrication of an atomic force microscope tip with a carbon nanotube: experimental investigation, *Nanotechnology*, vol. 17, pp. 2937-2941, 2006.

Jae-Hyeok Lee, et al., Fabrication of carbon nanotube AFM probes using the Langmuir-Blodgett technique, *Ultramicroscopy*, vol. 108, pp. 1163-1167, 2008.

Fa-Kuei Tung, et al., Hydrogen plasma enhanced alignment on CNT-STM tips grown by liquid catalyst-assisted microwave plasma-enhanced chemical vapor deposition, *Applied Surface Science*, vol. 254, pp. 7750-7754, 2008.

Office Action dated Jul. 22, 2010 received in U.S. Appl. No. 12/196,092, filed Aug. 21, 2008.

Hafner, et al., Catalytic growth of single-wall carbon nanotubes from metal particles, Chemical Physics Letters, 296, pp. 195-202, Oct. 30, 1998 Elsevier Science.

Heo, et al., Transmission-type Microfocus x-ray tube using carbon nanotube field emitters. *App. Phys. Lett.*, 90:1-3, 2007.

Kong, et al., Chemical vapor deposition of methane for single-walled carbon nanontubes, Chemical Physics Letters 292, pp. 567-574, Aug. 14, 1998 Elsevier Science.

Sulchek, et al., "High-speed atomic force microscopy in liquid," *Rev. Sci. Instrum.*, vol. 71, No. 5, pp. 2097-2099, May 2000.

Yudasaka, et al., "Specific conditions for Ni catalyzed carbon nanotube growth by chemical vapor deposition," *Appl. Phys. Lett.*, vol. 67, No. 17, pp. 2477-2479, Oct. 23, 1995.

File History for U.S. Appl. No. 12/196,092, for the period of Aug. 21, 2008 to Jan. 24, 2008.

\* cited by examiner

[Fig. 1]
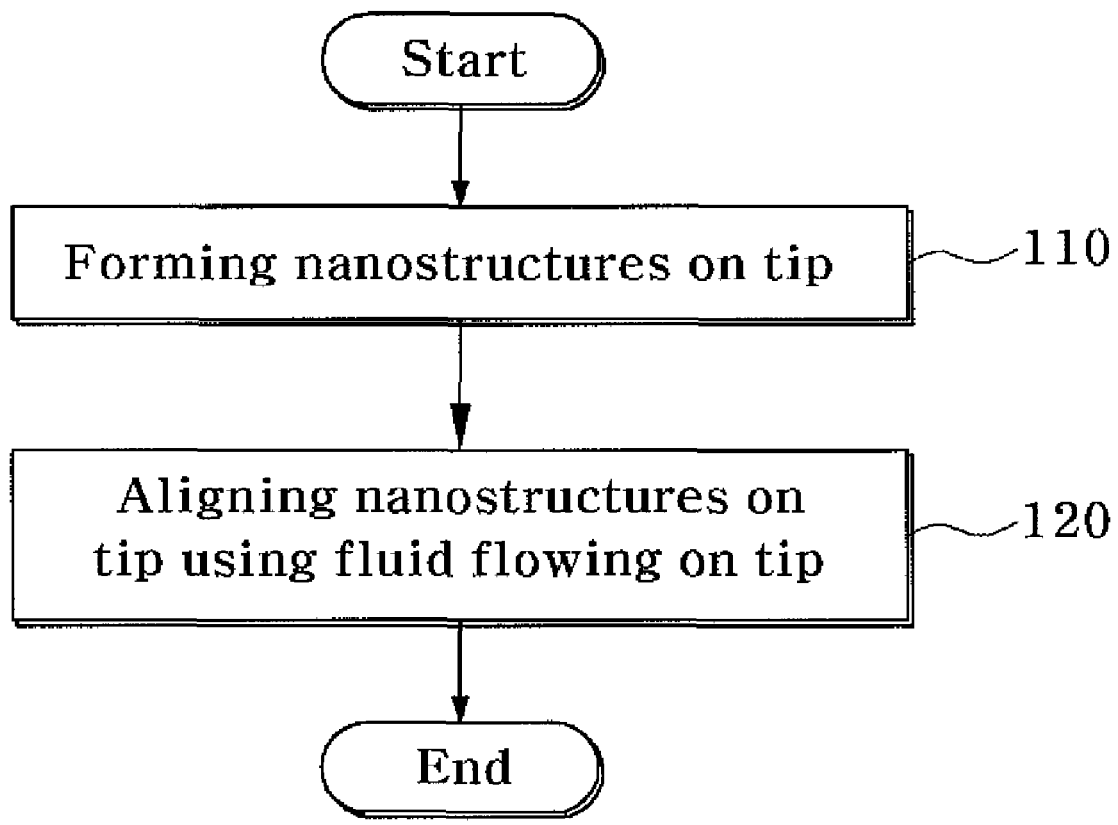

[Fig. 2]
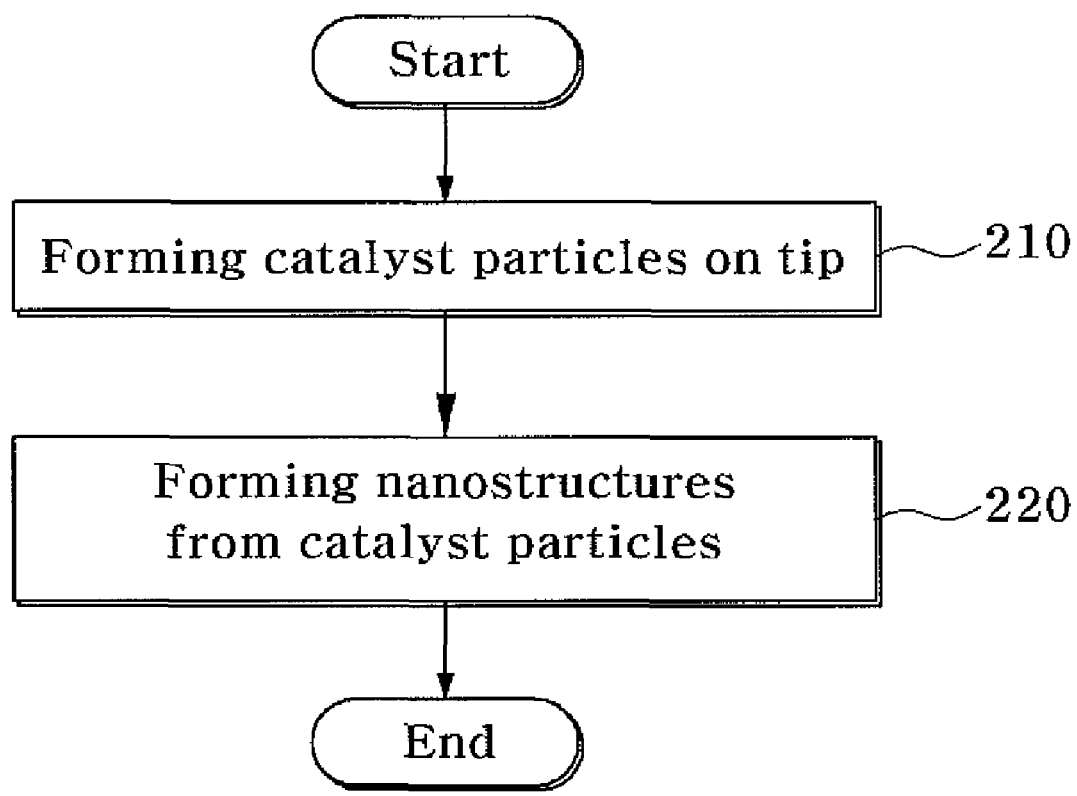

[Fig. 3]
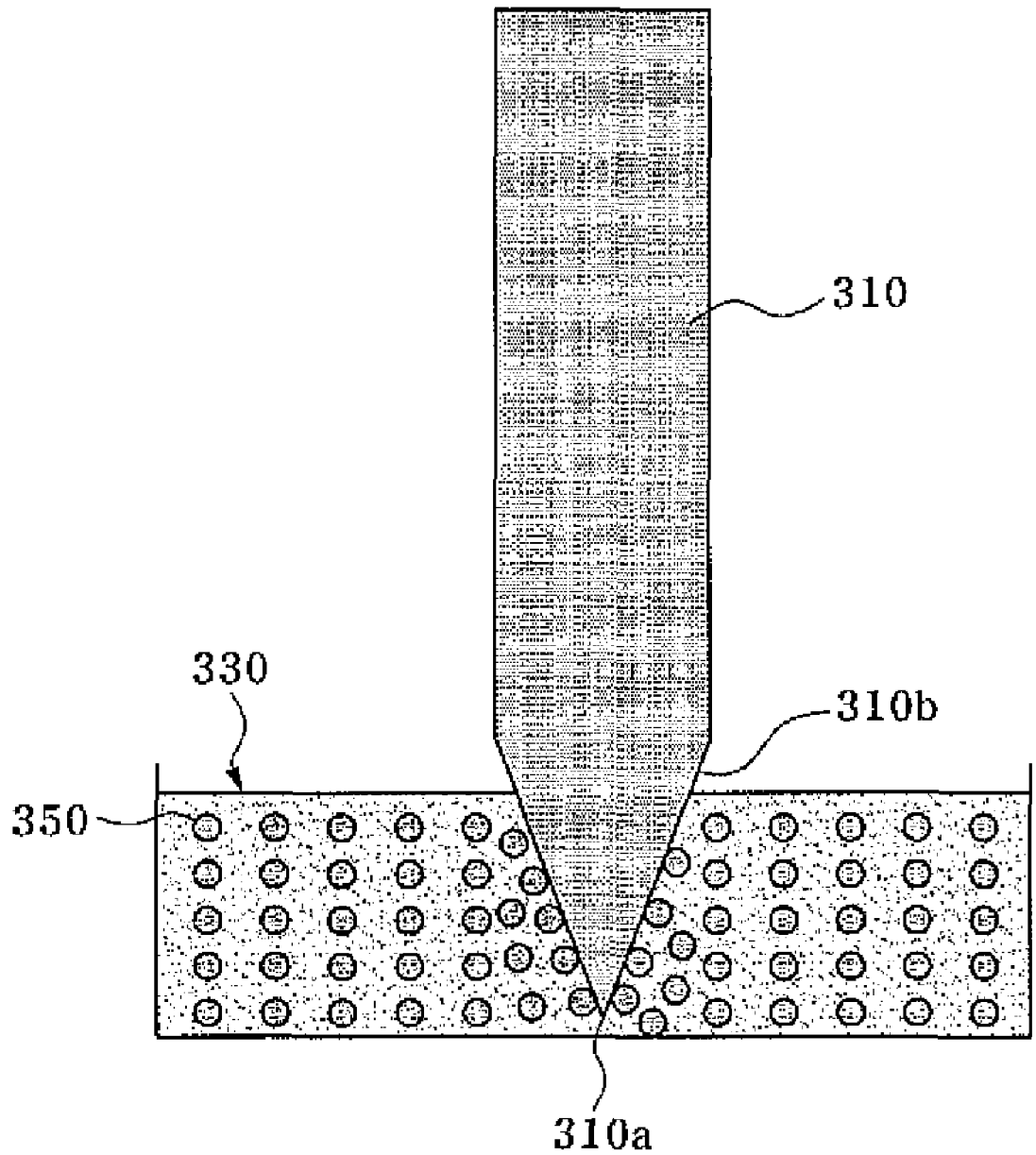

[Fig. 4]
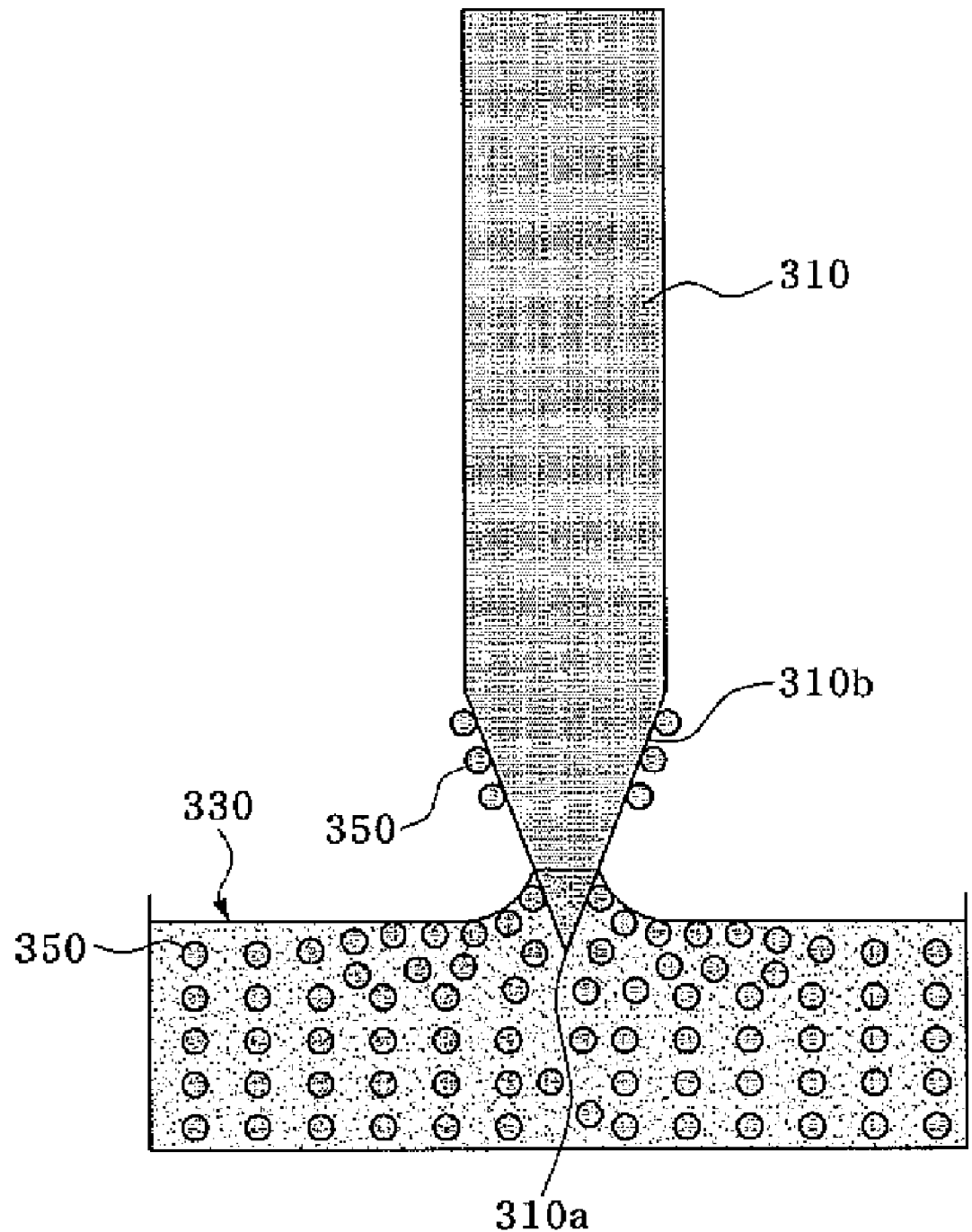

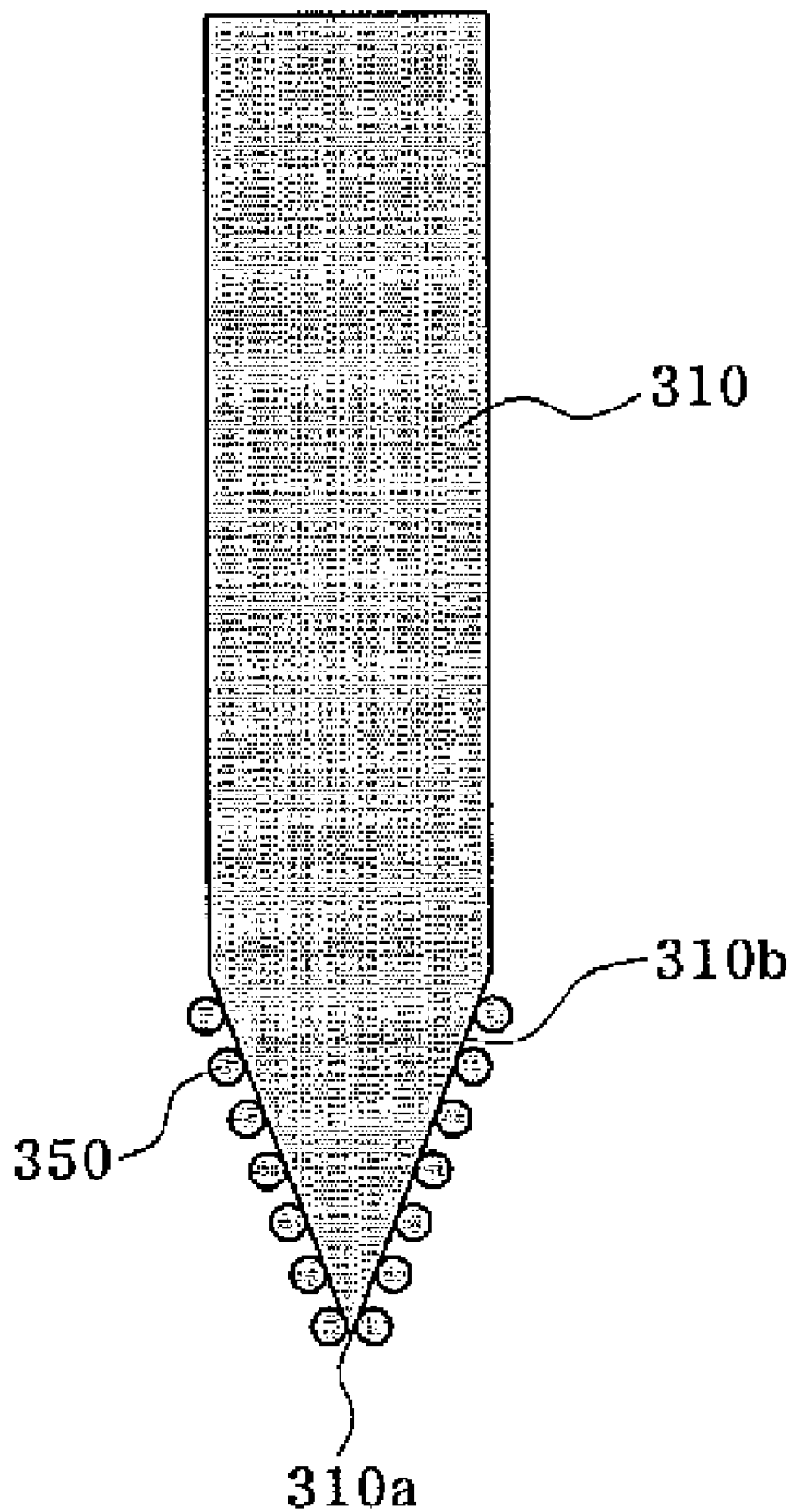
[Fig. 5]

[Fig. 6]
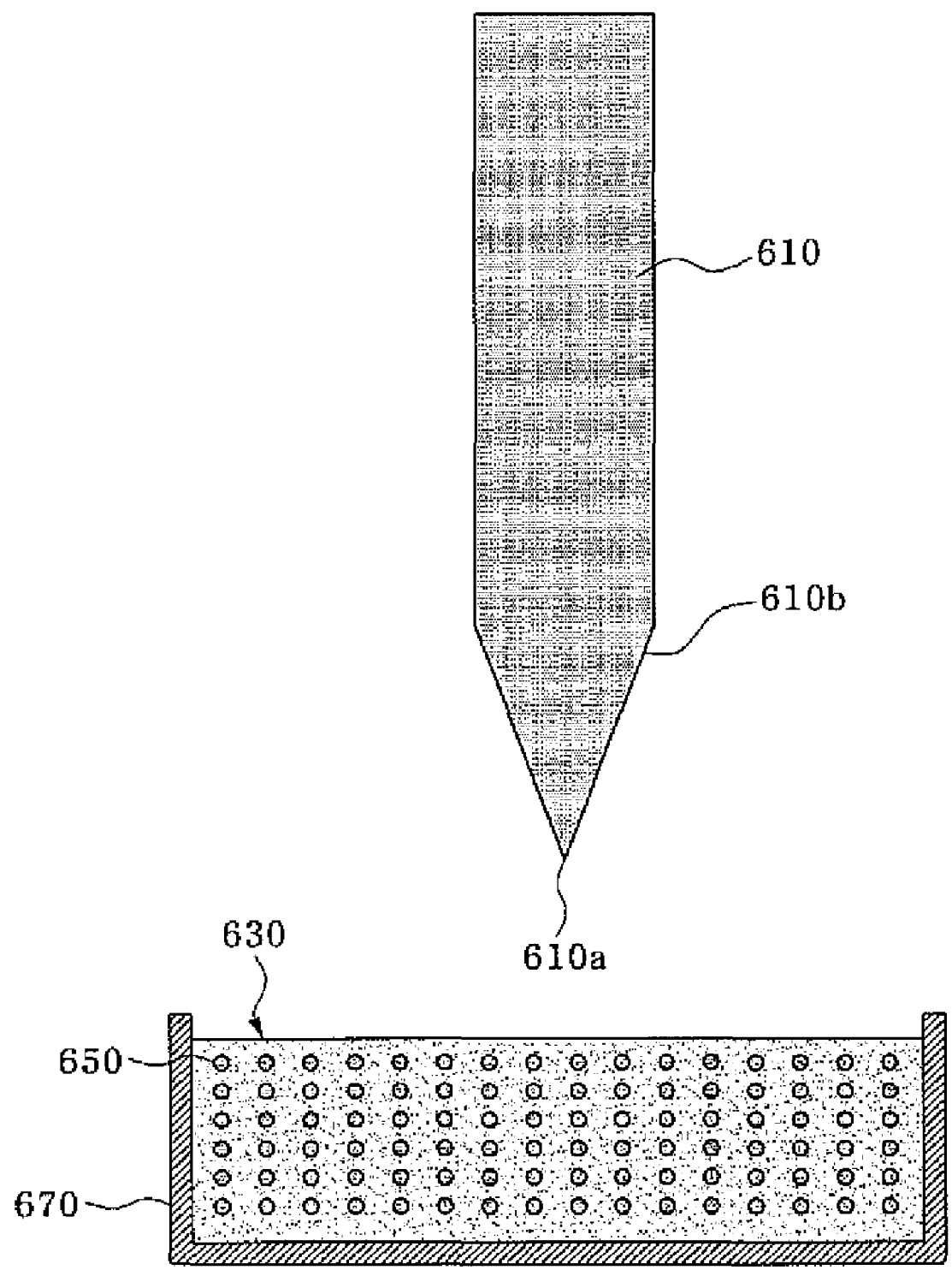

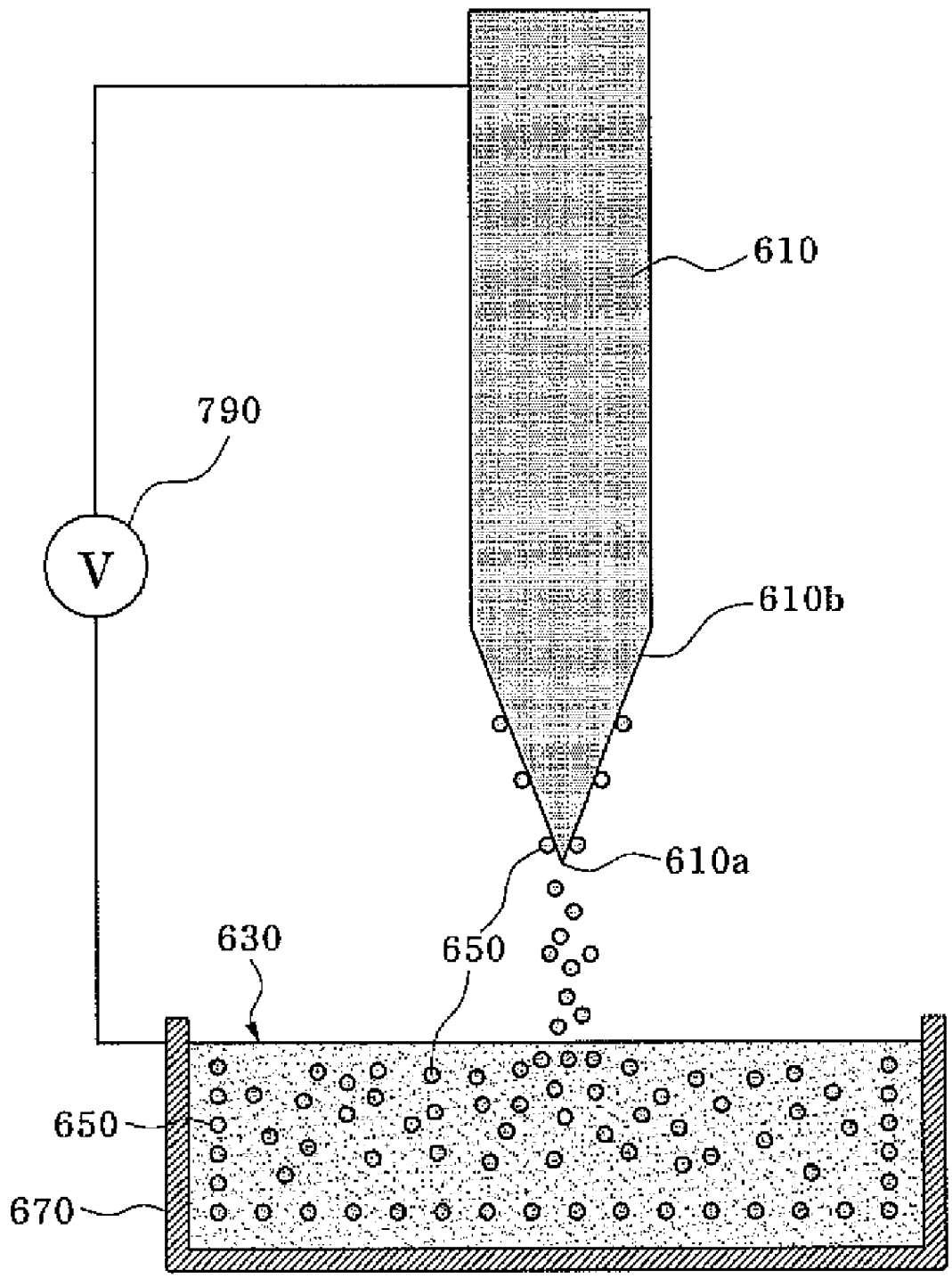
[Fig. 7]

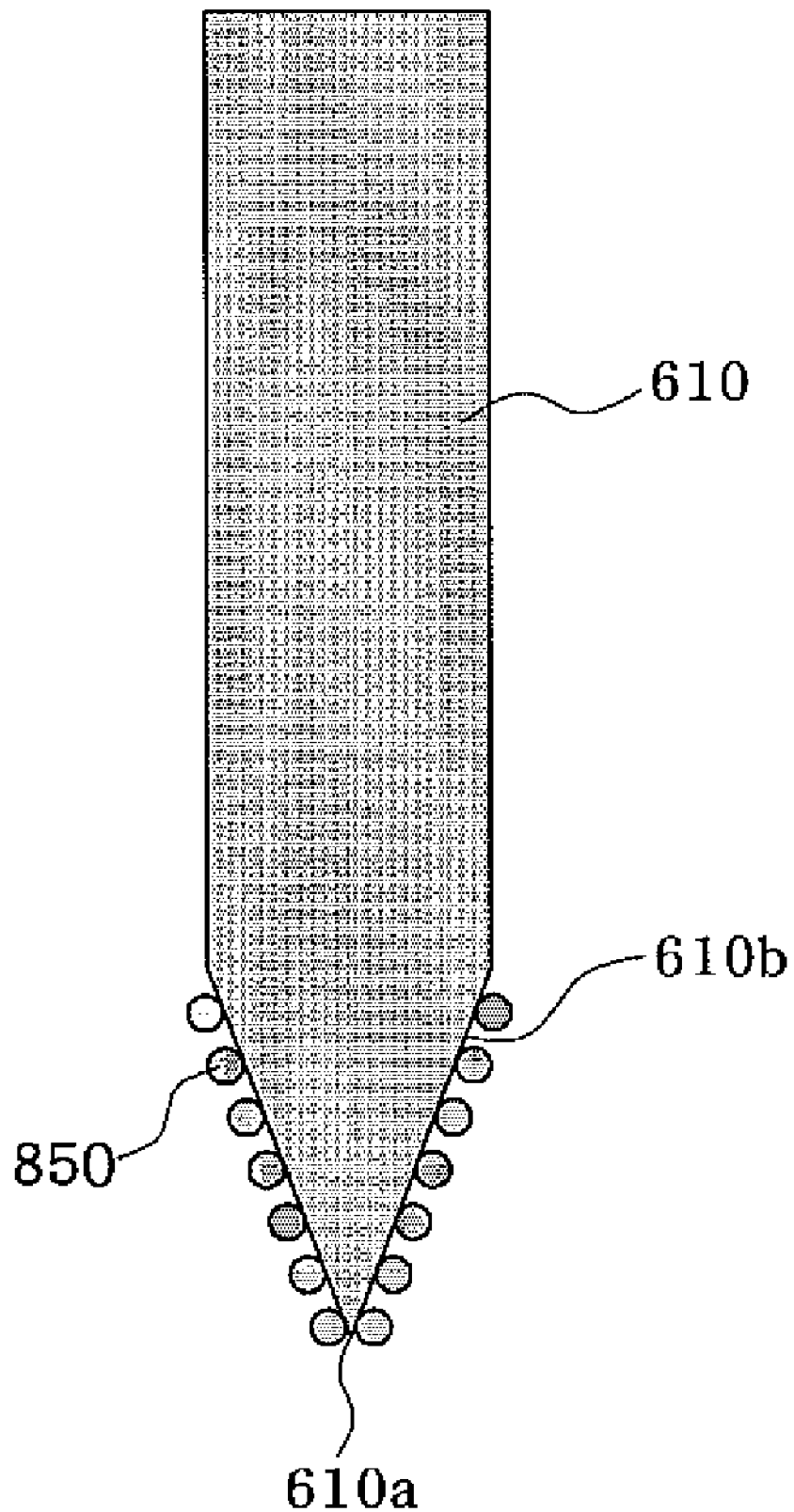
[Fig. 8]

[Fig. 9]
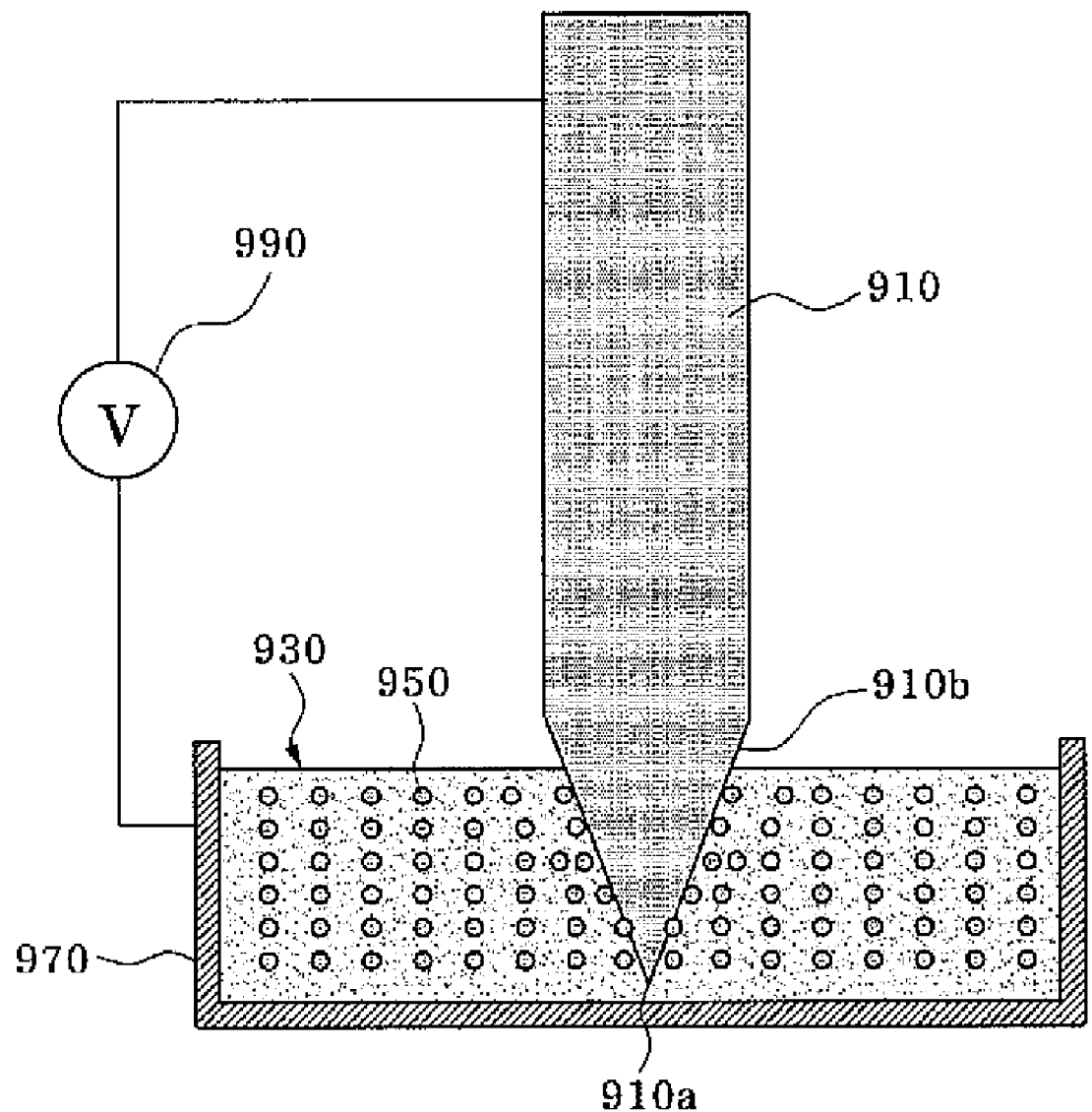

[Fig. 10]
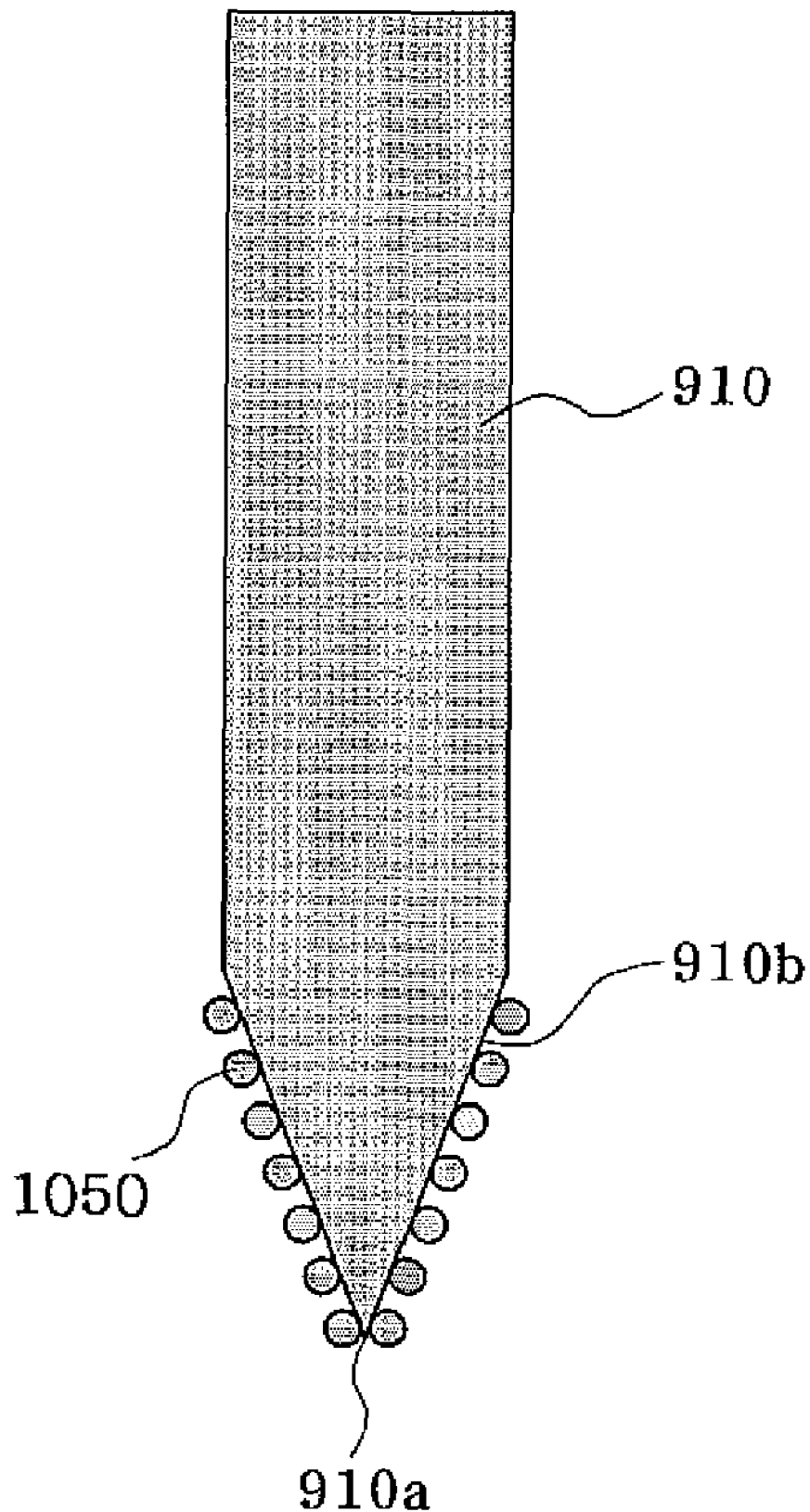

[Fig. 11]
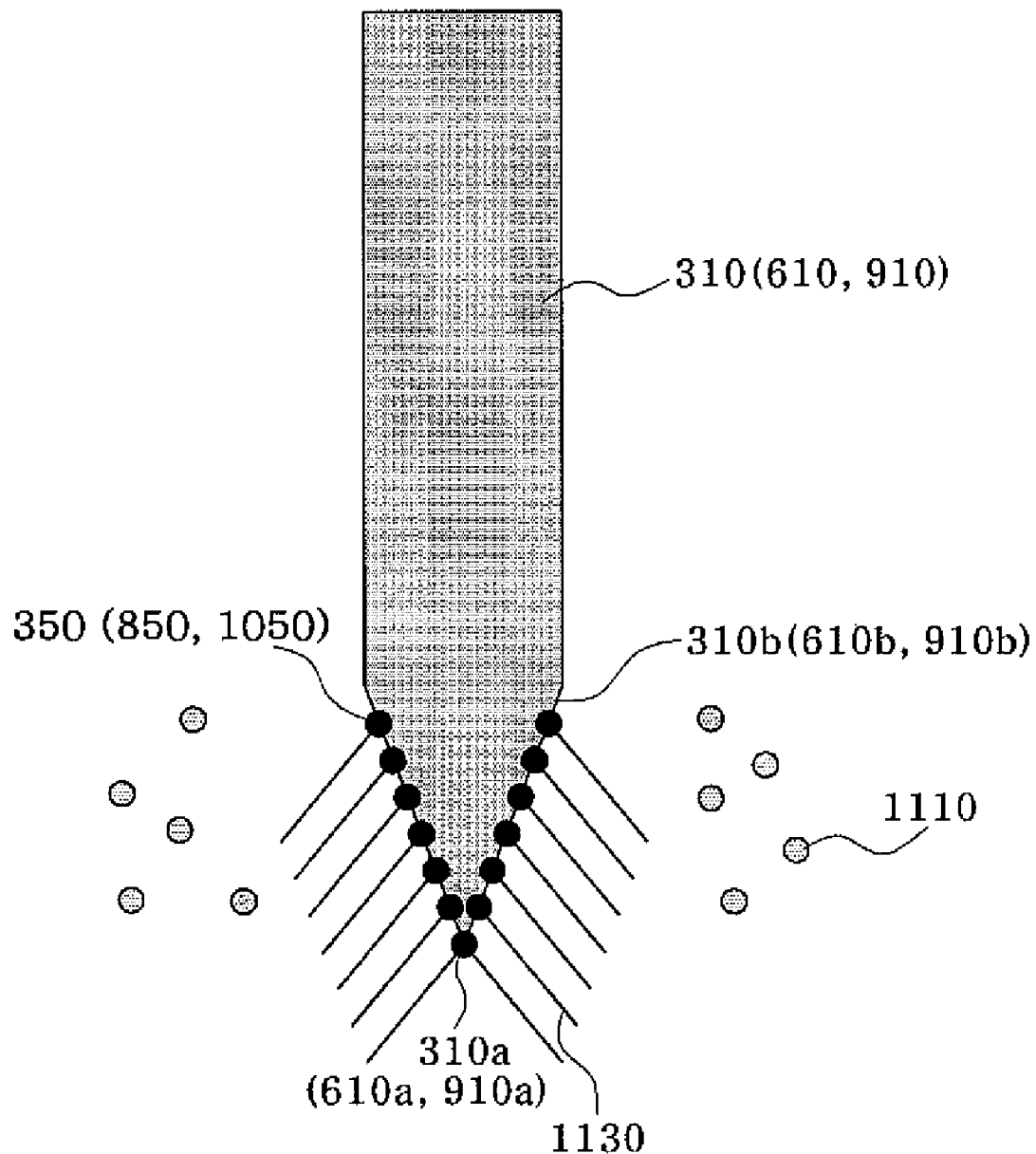

[Fig. 12]
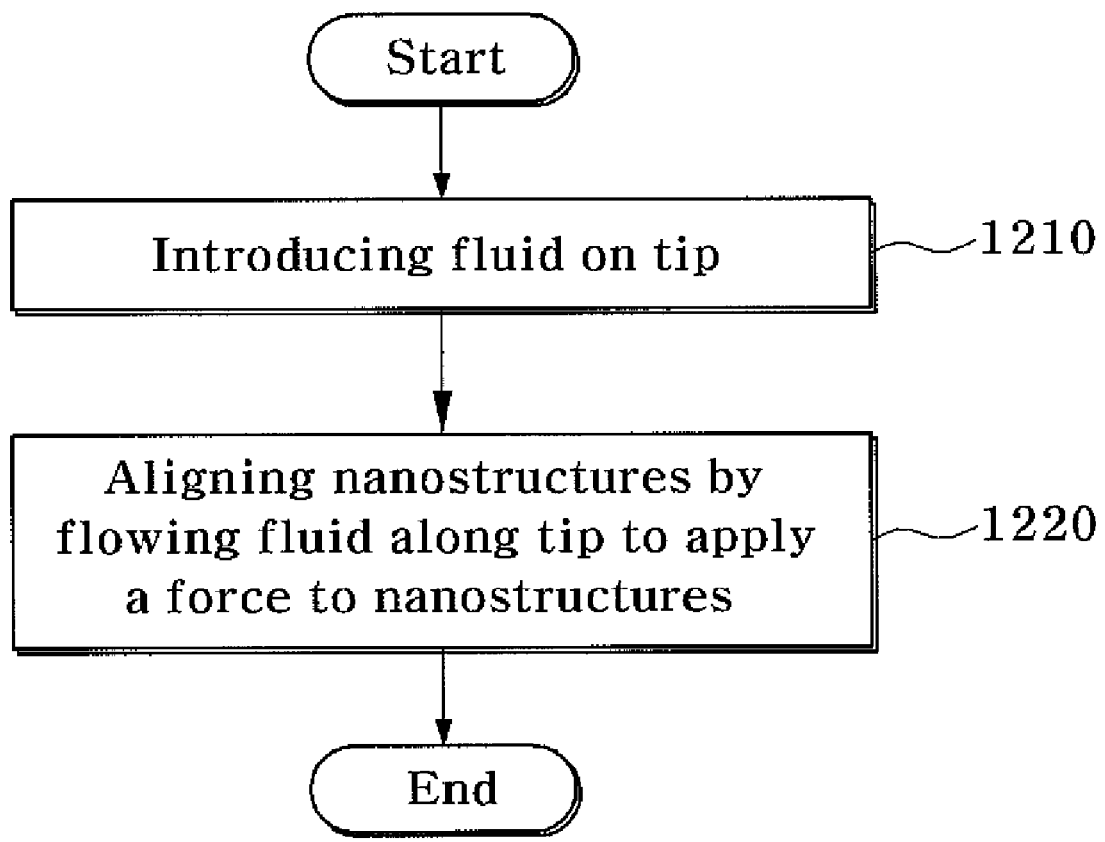

[Fig. 13]
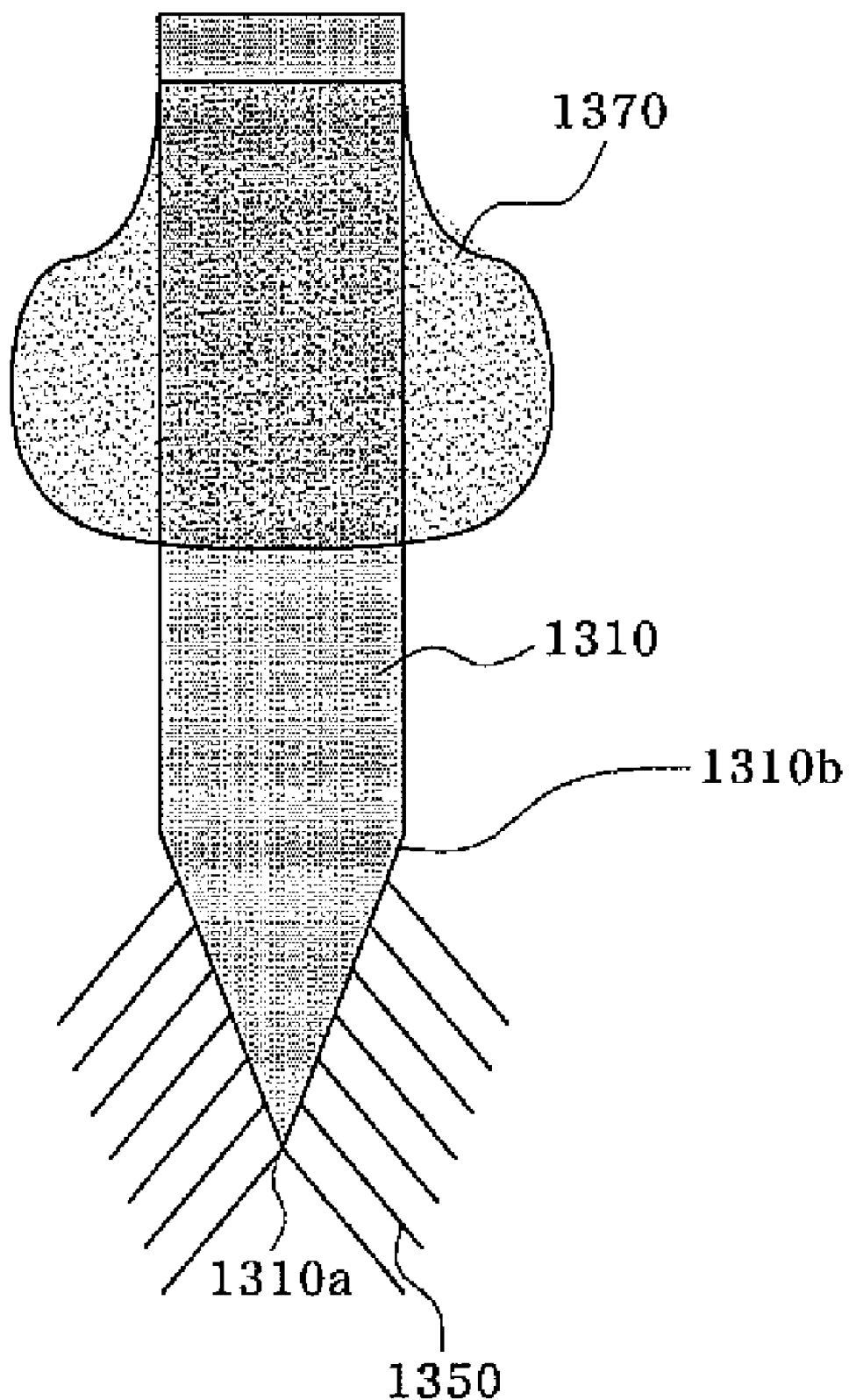

[Fig. 14]
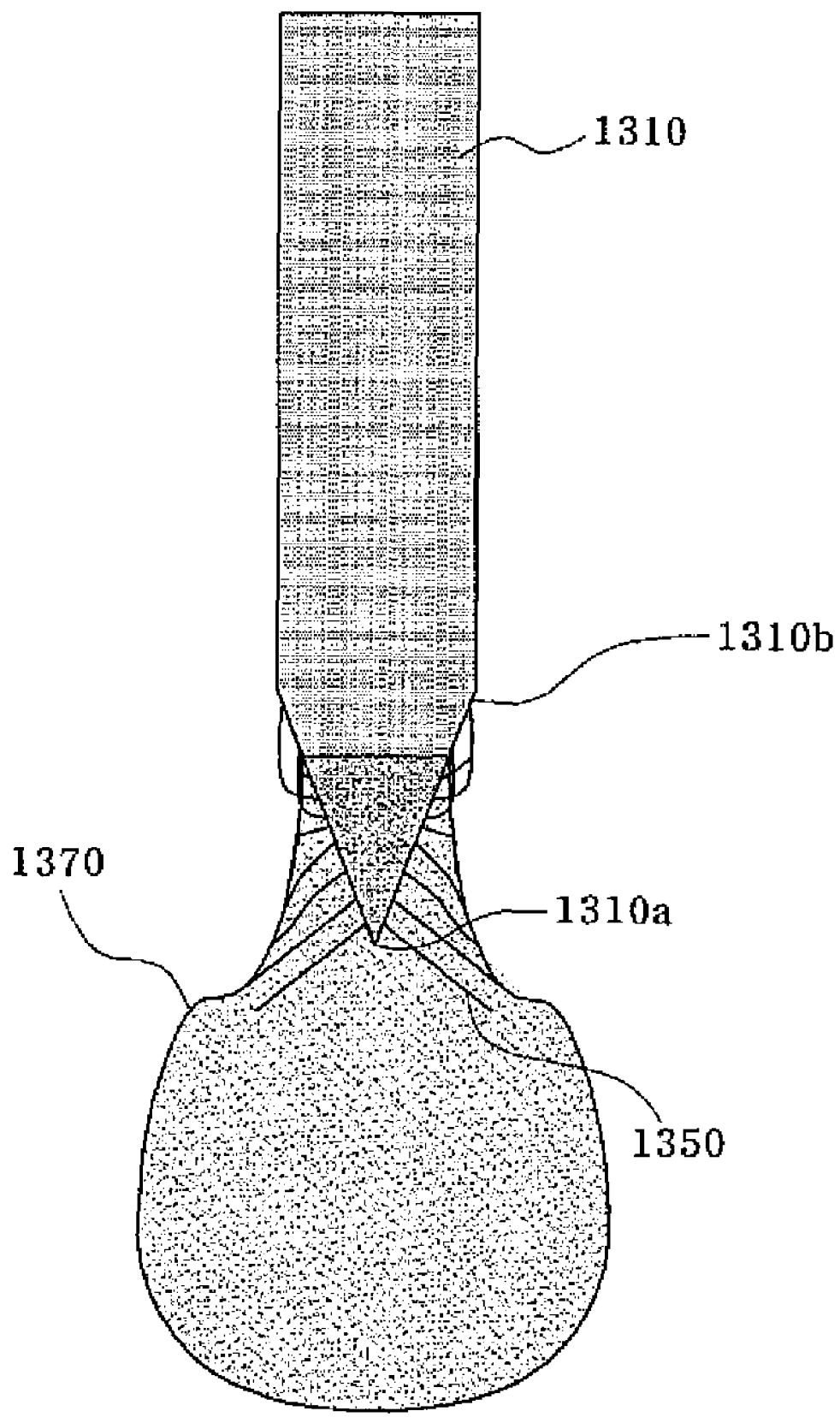

[Fig. 15]
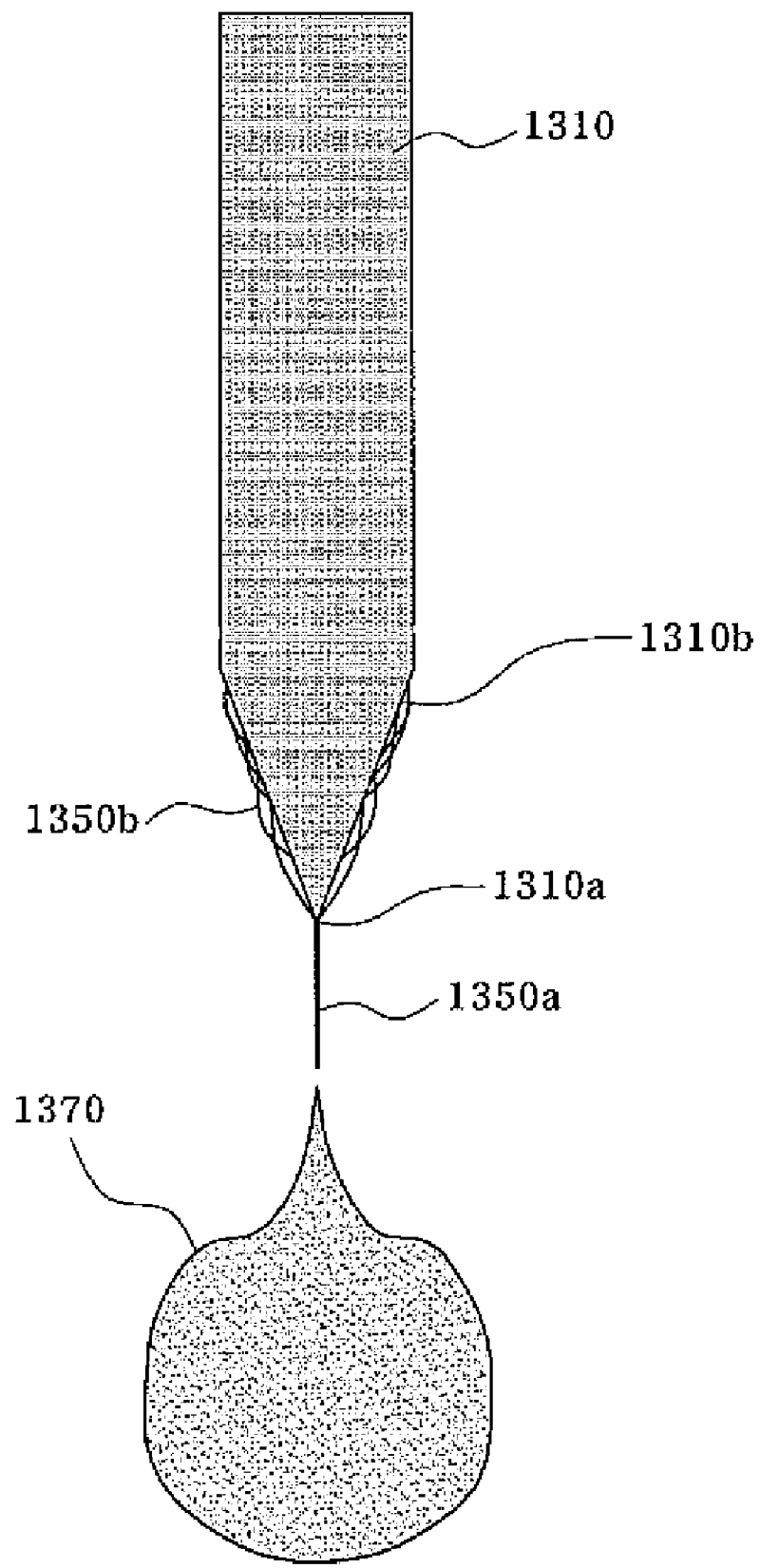

ALIGNED NANOSTRUCTURES ON A TIP

TECHNICAL FIELD

The present disclosure relates generally to nanostructures.

BACKGROUND

Recently, considerable research has been conducted on nanostructures including carbon nanotubes (CNTs), nanowires, nanorods, etc. One outcome of such research is the discovery that the CNT can be used as a tip of an atomic force microscope (AFM). The tip of the AFM typically requires strength high enough to resist impact with a specimen surface in operation and high resolution to reliably measure a contact structure having a high aspect ratio. To attain the high resolution, the tip may have a geometric structure with a high aspect ratio.

The CNTs possess good chemical-resistant properties and good mechanical strength. In addition, the CNTs may have the geometric structure with a high aspect ratio. Thus, the CNTs are a promising candidate for the tip of the AFM. For example, a needle-shaped CNT formed at an apex of the tip is suitable for use as a probe of a tip of the AFM. One method for attaching the CNT onto a silicon tip coated with an adhesive is disclosed in Appl. Phys. Lett. 73(23) 3465-3467, 1998 by S. S. Wong, et al. or Nature 384(14), 147-150, 1996 by H. Dai, et al.

To use the CNT as the probe of the tip of the AFM, the development of a technology that reliably forms the CNT to have good adhesion with the tip and have a high aspect ratio is needed. Further, it is necessary to obtain a technology that attaches the CNT onto the tip in a manner to have geometry substantially in parallel with a longitudinal direction of the tip.

SUMMARY

In one embodiment, a method for fabricating nanostructures aligned on a tip includes forming nanostructures on a tip and aligning the nanostructures on the tip using a fluid flowing on the tip.

In another embodiment, a method for fabricating nanostructures concentrated on a tip includes forming nanostructures on a tip and concentrating the nanostructures using capillary action between the tip and a fluid flowing on the tip.

In still another embodiment, an apparatus includes a tip having an apex and an inclined portion, first nanostructures aligned in a longitudinal direction of the tip at the apex of the tip, and second nanostructures aligned to surround the inclined portion of the tip.

In still another embodiment, an apparatus includes a tip having an apex, nanostructures concentrated in a longitudinal direction of the tip, and a catalyst used for forming the nanostructures.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a flow chart of an illustrative embodiment of a method for fabricating aligned nanostructures on a tip.

FIG. 2 is a flow chart of an illustrative embodiment of a method for forming nanostructures on a tip.

FIGS. 3 to 5 are schematic diagrams of an illustrative embodiment of a method for forming catalyst particles on a tip.

FIGS. 6 to 8 are schematic diagrams of another illustrative embodiment of a method for forming catalyst particles on a tip.

FIGS. 9 and 10 are schematic diagrams of still another illustrative embodiment of a method for forming catalyst particles on a tip.

FIG. 11 is a schematic diagram of an illustrative embodiment of a method for forming nanostructures from catalyst particles.

FIG. 12 is a flow chart of an illustrative embodiment of a method for aligning nanostructures on a tip.

FIGS. 13 to 15 are schematic diagrams of an illustrative embodiment of a method for aligning nanostructures on a tip.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

It will also be understood that when an element or layer is referred to as being "on," another element or layer, the element or layer may be directly on the other element or layer or intervening elements or layers may be present. As used herein, the term "and/or" may include any and all combinations of one or more of the associated listed items.

FIG. 1 is a flow chart of an illustrative embodiment of a method for forming aligned nanostructures on a tip. Referring to FIG. 1, beginning in block 110, nanostructures are formed on a tip. For example, the tip may be formed of a metal such as tungsten, nickel, aluminum, molybdenum, tantalum or niobium, or an alloy thereof. The nanostructures may include carbon nanotubes (CNTs) or nanowires. In block 120, a fluid is provided on the tip, and the fluid flowing along the tip aligns the nanostructures on the tip. For example, the fluid may be a liquid including water or an organic solvent. Examples of the organic solvent may include an alcohol, a ketone, an ester, etc. The method for forming the aligned nanostructures on the tip now will be described with respect to a method for forming the nanostructures on the tip and a method for aligning the nanostructures on the tip.

Method for Forming Nanostructures on a Tip

FIG. 2 is a flow chart of an illustrative embodiment of a method for fabricating nanostructures on a tip associated with block 110 of FIG. 1. Beginning in block 210, catalyst particles are formed on a tip. The catalyst particles may be metal catalyst particles. For example, the metal catalyst particles may include a metal such as nickel, cobalt, molybdenum or iron. Then, in block 220, the nanostructures are formed from the catalyst particles. Each process of the method for forming the nanostructures on the tip in some embodiments will now be further described with reference to FIGS. 3 to 9.

FIGS. 3 to 5 are schematic diagrams of an illustrative embodiment of a method for forming catalyst particles on a tip. Referring to FIG. 3, a tip 310 is immersed into a solution 330 including catalyst particles 350. The tip 310 may include an apex 310a and an inclined portion 310b. In one embodiment, at least a portion of the tip 310 including, for example, the apex 310a and the inclined portion 310b may be immersed into the solution 330. In another embodiment, substantially the entire tip 310 may be immersed into the solution 330.

The tip 310, for example, may include a metal such as tungsten, nickel, aluminum, molybdenum, tantalum or niobium, or an alloy thereof. In one embodiment, a metal wire may be electrochemically etched using a hydroxide solution to form the tip 310 including the apex 310a and the inclined portion 310b. For example, a tungsten wire may be electrochemically etched within a potassium hydroxide solution or a sodium hydroxide solution to form a tungsten tip including an apex and an inclined portion. For another example, an aluminum wire may be electrochemically etched within a hydrogen chloride solution mixed with a hydro sulfuric acid to form an aluminum tip with an apex and an inclined portion. In another embodiment, the tip 310 including the apex 310a and the inclined portion 310b may be formed by mechanically grinding a metal wire to have the shape as described above.

The solution 330 may be a colloidal solution including the catalyst particles 350. The solution 330, for example, may be an organic solvent or deionized water. The organic solvent, for example, may include alcohols such as methyl alcohol, ethyl alcohol, n-propyl alcohol, isopropyl alcohol, n-butyl alcohol, sec-butyl alcohol, t-butyl alcohol, and isobutyl alcohol; ketones such as acetone, methyl acetone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanediol, 1,5-pentanediol, 1,2-hexanediol, 1,6-hexanediol, 1,2,6-hexanetriol, hexylene glycol, glycerol, glycerol ethoxylate, and trimethylolpropane ethoxylate; lower alkyl ethers such as ethylene glycol monomethyl ether, ethylene glycol monoethyl ether, diethylene glycol methyl ether, diethylene glycol ethyl ether, triethylene glycol monomethyl ether, and triethylene glycol monoethyl ether; nitrogen compounds such as 2-pyrrolidone, N-methyl-2-pyrrolidone, and caprolactam; dimethyl sulfoxide, tetramethylenesulfone, tioglycol, etc., which may be used alone or in combination thereof.

The catalyst particles 350 may be dispersed in the solution 330. The catalyst particles 350 may be metal catalyst particles. The metallic catalyst particles, for example, may include a metal such as nickel, cobalt, molybdenum, platinum or iron, or an alloy thereof. Portions of the tip 310 immersed into the solution 330 may contact the catalyst particles 350 in the solution 330.

Referring to FIGS. 4 and 5, the tip 310 immersed into the solution 330 is pulled or raised out of the solution 330. When the tip 310 is pulled out of the solution 330, some of the solution 330 may be transferred to the tip 310. In other words, some of the solution 330 may remain on the tip 310. In one embodiment, when an adhesion force between molecules of the solution 330 and molecules of the tip 310 is stronger than a cohesive force between the molecules of the solution 330, the solution 330 may be transferred to the tip 310 as a result of a capillary phenomenon. The solution 330 on the tip 310 may be readily evaporated from the tip 310 in the atmosphere environment and the catalyst particles 350 in the solution 330 may remain on the tip 310. As a result, the catalyst particles 350 may form on the tip 310. In one embodiment, the inclined portion 310b of the tip 310 is immersed into the solution 330, thus causing the catalyst particles 350 to be formed on the inclined portion 310b of the tip 310 when the solution 310 that is transferred on the tip 310 and the inclined portion 310b is evaporated.

FIGS. 6 to 8 are schematic diagrams of another illustrative embodiment of a method for forming catalyst particles on a tip. Referring to FIG. 6, a tip 610 is disposed to be spaced apart from an electrolyte solution 630. For example, the tip 610 may be disposed over the electrolyte solution 630. The tip 610 may include an apex 610a and an inclined portion 610b. The tip 610 having the apex 610a and the inclined portion 610b is substantially the same as the tip 310 having the apex 310a and the inclined portion 310b described with reference to FIGS. 3 to 5. Therefore, a detailed description of the tip 610 having the apex 610a and the inclined portion 610b is omitted for simplicity.

The electrolyte solution 630 may include metal catalyst ions 650 and the electrolyte solution 630 may be provided within an electrode container 670. The metal catalyst ions 650 may be formed from metal catalysts in the electrolyte solution 630. In one embodiment, the metal catalyst ions 650 may be metal cations having positive charges when the metal catalysts discharge some electrons thereof into the electrolyte solution 630. In another embodiment, the metal catalyst ions 650 may be metal anions having negative charges when the metal catalysts obtain some electrons from the electrolyte solution 630. The metal catalyst ions 650 may include, for example, nickel ions, cobalt ions, molybdenum ions, iron ions, etc., or a combination thereof.

Referring to FIG. 7, an external power source 790 applies a voltage to the electrolyte solution 630 to emit the metal catalyst ions 650 from the electrolyte solution 630. As illustrated, the external power source 790 is disposed between the tip 610 and the electrolyte solution 630 to apply the voltage to the electrolyte solution 630. In one embodiment, when the metal catalyst ions 650 have positive charges, the voltage may be applied to allow the tip 610 to have a negative potential and the electrolyte solution 630 to have a positive potential. In another embodiment, when the metal catalyst ions 650 have negative charges, the voltage may be applied to allow the tip 610 to have a positive potential and the electrolyte solution 630 to have a negative potential.

The voltage applied to the electrolyte solution 630 generates an electrostatic force. The generated electrostatic force may cause the metal catalyst ions 650 to gather toward the surface of the electrolyte solution 630. The metal catalyst ions 650 gathered toward the surface of the electrolyte solution 630 may exhibit electrostatic repulsion against each other. Then, when a voltage exceeding a threshold voltage is applied, the metal catalyst ions 650 can overcome the surface tension of the electrolyte solution 630 so that the metal catalyst ions 650 are emitted from the surface of the electrolyte solution 630. The threshold voltage means a critical voltage applied into the electrolyte solution 630, which is an upper limit voltage that metal catalyst ions 650 can exist in the electrolyte solution 630 in spite of the electrostatic repulsion against each other and the electrostatic repulsion with the electrolyte solution 630. For example, when the distance between the electrolyte solution 630 including nickel catalyst ions and the tip 610 formed of tungsten is about 50 μm, the threshold voltage may be about several tens of volts.

As illustrated in FIG. 7, the emitted metal catalyst ions 650 may attach to the tip 610. The electric field formed around the tip 610 by the voltage may induce the metal catalyst ions 650 emitted from the electrolyte solution 630 toward the tip 610.

In one embodiment, the electric field is concentrated on the apex 610a of the tip 610, and the emitted metal catalyst ions 650 may become attached to the apex 610a of the tip 610. The attached metal catalyst ions 650 may receive electrons from the tip 610 or discharge electrons to the tip 610 so that the metal catalyst ions 650 are reduced or oxidized to become metal catalyst atoms on the tip 610.

Referring to FIG. 8, catalyst particles 850 form on the tip 610. The metal catalyst atoms reduced or oxidized on the tip 610 bond to each other to form the catalyst particles 850 on the tip 610.

FIGS. 9 and 10 are schematic diagrams of still another illustrative embodiment of a method for forming catalyst particles on a tip. Referring to FIG. 9, a tip 910 having an apex 910a and an inclined portion 910b may be immersed into an electrolyte solution 930 including metal catalyst ions 950. An external power source 990 may apply a voltage to the electrolyte solution 930 to emit the metal catalyst ions 950 from the electrolyte solution 930. The electrolyte solution 930 including the metal catalyst ions 950 may be provided within an electrode container 970. The tip 910, the electrolyte solution 930, the metal catalyst ions 950, the electrode container 970 and the external power source 990 are substantially the same as the tip 610, the electrolyte solution 630, the metal catalyst ions 650, the electrode container 670 and the external power source 790 described with reference to FIGS. 6 to 8.

The external power source 990 applies a voltage between the tip 910 and the electrolyte solution 930 while the tip 910 is immersed into the electrolyte solution 930. When the voltage is applied and an electric field is formed between the tip 910 and the electrolyte solution 930, the metal catalyst ions 950 in the electrolyte solution 930 are attached to the tip 910 and then reduced or oxidized to become the metal catalyst atoms on the tip 910.

Referring to FIG. 10, the metal catalyst atoms reduced or oxidized on the tip 910 bond to each other to form metal catalyst particles 1050 on the tip 910.

FIG. 11 is a schematic diagram of an illustrative embodiment of a method for forming nanostructures from catalyst particles. As depicted, nanostructures may be formed from the catalyst particles 350, 850 and 1050 described with reference to FIGS. 5, 8 and 10. Hereinafter, a method for forming CNTs as an example of the nanostructures will now be described.

In one embodiment, a reaction gas 1110 including hydrocarbon is introduced onto the catalyst particles 350, 850 and 1050 to form CNTs 1130 from the catalyst particles 350, 850 and 1050. The hydrocarbon may include monoxide, acetylene, ethylene, ethane, methane, propane, or a combination thereof. The method for forming the CNTs 1130 may be carried out by a chemical vapor deposition (CVD) process using, for example, heat, plasma or microwave as an energy source.

The reaction gas 1110 including the hydrocarbon is dissolved on the catalyst particles 350, 850 and 1050 by, for example, the heat, plasma or microwave. Carbon atoms separated from the hydrocarbon in the dissolved reaction gas 1110 diffuse into the catalyst particles 350, 850 and 1050 and the carbon atoms are flied with the catalyst particles 350, 850 and 1050. When the carbon atoms are filled beyond the solubility of carbon in the catalyst particles 350, 850 and 1050, precipitation of the carbon atoms occurs. Due to the precipitation, the carbon atoms are extracted from the catalyst particles 350, 850 and 1050. Then, the extracted carbon atoms are rearranged on the interface with the catalyst particles 350, 850 and 1050. The rearranged carbon atoms grow from the interface to form the CNTs 1130 on the tip 310, 610 and 910.

As shown in FIG. 11, in one embodiment, the CNTs 1130 are formed over the catalyst particles 350, 850 and 1050 while the catalyst particles 350, 850 and 1050 are attached to the tips 310, 610 and 910, respectively. In another embodiment, the carbon atoms of the dissolved reaction gas 1110 may diffuse from the top surfaces into the bottom surfaces of the catalyst particles 350, 850 and 1050, and then be precipitated from the bottom surfaces of the catalyst particles 350, 850 and 1050. As a result, the CNTs 1130 may form below the catalyst particles 350, 850 and 1050. The catalyst particles 350, 850 and 1050 may remain on the CNTs 1130 after the CNTs 1130 are formed from the catalyst particles 350, 850 and 1050.

In one embodiment, an electrode (not shown) may be positioned apart from the tips 310, 610 or 910. For example, the electrode may be disposed below the tip 310, 610 and 910. A voltage, such as an external voltage, may be applied between the tips 310, 610 and 910 and the electrode while the CNTs 1130 are being formed on the tips 310, 610 and 910. An electric field generated by the voltage may prevent the CNTs 1130 from randomly growing on the tips 310, 610 and 910. The electric filed may interact with the CNTs 1130 growing on the tips 310, 610, and 910. The electric field may change the internal dipole polarity of the CNTs 1130 and generate torque and force to align the CNTs 1130. Accordingly, the electric field may change the growth direction of the CNTs 1130 on the tips 310, 610 and 910, thus allowing the CNTs 1130 to be aligned along the electric filed.

The nanostructures other than the CNTs 1130 may be formed by the similar method as the method of forming the CNTs 1130 described with reference to FIG. 11. That is, a predetermined source gas corresponding to the nanostructures may be provided and dissolved on metal catalyst particles, and the nanostructures may be formed by reactions between the dissolved source gas and the metal catalyst particles. In one embodiment, silicon carbide nanorods may be formed by a CVD method using a vaporized $C_6H_{18}Si_2$ gas as the source gas and iron particles as the metal catalyst particles. In another embodiment, silicon oxide nanowires may be formed by an evaporation method using a vaporized SiO gas as the source gas and iron particles as the metal catalyst particles Some illustrative embodiments of the method for forming the nanostructures on the tip described with reference to FIGS. 3 to 11 include forming catalyst particles on a tip and forming nanostructures from the catalyst particles. In other embodiments, the method for forming the nanostructures on the tip may be achieved by preparing nanostructures that are already fabricated and attaching the nanostructures onto a tip.

Method for Aligning Nanostructures on Tip

FIG. 12 is a flow chart of an illustrative embodiment of a method for aligning nanostructures on a tip. Beginning in block 1210, a fluid is introduced on a tip including nanostructures. In block 1220, the fluid flowing along the tip applies a force to the nanostructures, which aligns the nanostructures on the tip. The force may be a capillary force between the tip and the fluid. As a result, the aligned nanostructures are formed on the tip. Each process of the method for aligning the nanostructures on the tip will now be described with reference to FIGS. 13 to 15.

Referring to FIG. 13, a fluid 1370 is introduced on a tip 1310 including nanostructures 1350. The nanostructures 1350, for example, may include CNTs, nanowires or nanorods. The nanostructures 1350 may be the CNTs 1130 described with reference to FIG. 11. Alternatively, the nanostructures 1350 may be nanostructures formed on the tip by various other methods as described above. The tip 1310 may include an apex 1310a and an inclined portion 1310b. The tip 1310 is substantially the same as the tips 310, 610 and 910 described with reference to FIGS. 1 to 11. The fluid 1370 may have wettability with respect to the tip 1310. The fluid 1370, for example, may include water or an organic solvent. The organic solvent, for example, may include alcohols such as methyl alcohol, ethyl alcohol, n-propyl alcohol, isopropyl alcohol, n-butyl alcohol, sec-butyl alcohol, t-butyl alcohol, and isobutyl alcohol; ketones such as acetone, methyl acetone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanediol, 1,5-pentanediol, 1,2-hexanediol, 1,6-hexanediol, 1,2,6-hexanetriol, hexylene glycol, glycerol, glycerol ethoxylate, and trimethylolpropane ethoxylate; lower alkyl ethers such as ethylene glycol monomethyl ether, ethylene glycol monoethyl ether, diethylene glycol methyl ether, diethylene glycol ethyl ether, triethylene glycol monomethyl ether, and triethylene glycol monoethyl ether; nitrogen compounds such as 2-pyrrolidone, N-methyl-2-pyrrolidone, and caprolactam; dimethyl sulfoxide, tetramethylenesulfone, tioglycol, etc., which may be used alone or in combination thereof.

The fluid 1370 may be introduced to a region of the tip 1310 where the nanostructures 1350 are not formed. In one embodiment, the fluid 1370 may be introduced on the tip 1310 by spraying the fluid in the form of droplets to portions of the tip 1310. The portions of the tip 1310 are the region where the nanostructures 1350 are not formed. In another embodiment, the fluid 1370 may be introduced on the tip 1310 by dipping the portions of the tip 1310 into a solution including the fluid 1370.

The fluid 1370 introduced on the tip 1310 may flow toward the nanostructures 1350 along a longitudinal direction of the tip 1310. In one embodiment, the tip 1310 may be disposed to be substantially vertical to the ground so that the fluid 1370 flows downward on the tip 1310 as a result of gravitational force. In another embodiment, an inert gas flow may be provided onto the tip 1310, thus flowing the fluid 1370 toward the nanostructures. For example, the inert gas may include nitrogen, helium, hydrogen, etc., or in combinations thereof. The inert gas flow may be generated by injecting the inert gas from the controlled gas injector into the longitudinal direction of the tip 1310. The inert gas flowing along the longitudinal direction of the tip 1310 may act a physical force to the fluid 1370, thus allowing the fluid 1370 to flow along the tip 1310.

When the fluid 1370 flows on the tip 1310, capillary force may occur at an interface between the fluid 1370 and the tip 1310. As illustrated in FIG. 13, when the capillary force between molecules of the fluid 1370 and molecules of the tip 1310 is greater than an intermolecular attraction of the fluid 1370, the tip 1310 may draw the fluid 1370 in an opposite direction to a flow direction of the fluid 1370 at the interface between the fluid 1370 and the tip 1310.

Referring to FIG. 14, the fluid 1370 flowing on the tip 1310 contacts the nanostructures 1350. In one embodiment, the nanostructures 1350 may be formed on the inclined portion 1310b, so that the fluid 1370 may flow toward the apex 1310a along the inclined portion 1310b. The nanostructures 1350 have wettability with respect to the fluid 1370.

The fluid 1370 flowing on the tip 1310 may apply a physical force to the nanostructures 1350 when the fluid 1370 passes the nanostructures 1350. The physical force may be caused by the flow of the fluid 1370 and by the capillary action occurring at the interface between the fluid 1370 and the tip 1310 when the fluid 1370 flows along the tip 1310. After contacting the fluid 1370, the nanostructures 1350 may become aligned on the tip 1310 substantially in the flow direction of the fluid 1370 by the physical force from the fluid 1370.

Referring to FIG. 15, the nanostructures 1350 in FIG. 14 become aligned on the tip 1310 after the fluid 1370 passes the nanostructures 1350. In one embodiment, the nanostructures 1350 shown in FIG. 14 may be divided into first nanostructures 1350a aligned substantially in a longitudinal direction of the tip 1310 at the apex 1310a of the tip 1310 and second nanostructures 1350b aligned in a manner as to surround the inclined portion 1310b of the tip 1310. The first nanostructures 1350a may include at least one single-walled CNT having a diameter of less than about 100 nm. The single walled CNT positioned at the apex 1310a may have a diameter of approximately 1 to 10 nm. Thus, the first nanostructures 1350a may have a very long length compared with a diameter. Accordingly, the first nanostructures 1350a may have a geometry structure with a high aspect ratio. As a result, the first nanostructures 1350a that are aligned substantially parallel to the longitudinal direction of the tip 1310 and that have a small diameter of less than about 100 nm may be used as a probe tip of an AFM.

As described above, nanostructures can be aligned around an apex of a tip using a fluid flowing along the tip. In addition, the nanostructures aligned around the apex of the tip can have a geometric structure with a high aspect ratio that is substantially parallel to a longitudinal direction of the tip. Therefore, the nanostructures can be applied to apparatuses requiring the tip with a high aspect ratio such as, for example, atomic force microscopy (AFM) or scanning probe microscopy (SPM). In addition, the nanostructures can be applied to an electron emitter of a field emission device requiring a high electric field concentration.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure which is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A method for fabricating aligned nanostructures on a tip, comprising:
    forming nanostructures on a tip, wherein the forming of the nanostructures on the tip comprises:
        forming catalyst particles on the tip; and
        providing a reaction gas to the catalyst particles on the tip to form the nanostructures; and
    aligning the nanostructures on the tip using a fluid flowing on the tip,
    wherein said forming of the catalyst particles on the tip comprises:
        disposing the tip to be spaced apart from an electrolyte solution including metal catalyst ions;
        applying an electric field to the electrolyte solution to emit the metal catalyst ions from the electrolyte solution, wherein the electric field is applied while the tip is spaced apart from the electrolyte solution; and attaching the emitted metal catalyst ions to the tip to form the catalyst particles.

2. The method of claim 1, wherein the nanostructures include carbon nanotubes or nanowires.

3. The method of claim 1, wherein the catalyst particles comprise at least one selected from the group consisting of nickel, cobalt, molybdenum and iron.

4. The method of claim 1, wherein the aligning of the nanostructures on the tip comprises:

introducing the fluid on the tip; and contacting the fluid with the nanostructures by flowing the fluid toward the nano structures.

5. The method of claim 4, wherein the fluid has wettability with respect to the tip.

6. The method of claim 4, wherein the fluid has wettability with respect to the nano structures.

7. The method of claim 4, wherein the fluid comprises water or an organic solvent.

8. The method of claim 4, wherein the introducing of the fluid on the tip comprises spraying the fluid in the form of droplets to a region other than a region where the nanostructures are formed.

9. The method of claim 4, wherein the introducing of the fluid on the tip comprises dipping a region of the tip where the nanostructures are not formed into a solution including the fluid.

10. The method of claim 4, wherein the fluid flows toward the nanostructures by gravitational force.

11. The method of claim 4, wherein the fluid flows toward the nanostructures by an inert gas flow provided into the tip.

12. The method of claim 11, wherein the inert gas comprises at least one selected from the group consisting of nitrogen, helium and hydrogen.

13. The method of claim 4, wherein the contacting of the fluid with the nanostructures comprises allowing the fluid to apply a physical force to the nanostructures to align the nanostructures in a flow direction of the fluid.

14. The method of claim 13, wherein the physical force is generated by capillary force between the fluid and the tip.

15. A tip comprising aligned nanostructures, wherein the tip is formed by the method of claim 1.

* * * * *

UNITED STATES PATENT AND TRADEMARK OFFICE
CERTIFICATE OF CORRECTION

| | | |
|---|---|---|
| PATENT NO. | : 7,917,966 B2 | Page 1 of 1 |
| APPLICATION NO. | : 12/196194 | |
| DATED | : March 29, 2011 | |
| INVENTOR(S) | : Kim et al. | |

It is certified that error appears in the above-identified patent and that said Letters Patent is hereby corrected as shown below:

On the Title page, Item (56), under "OTHER PUBLICATIONS", Line 2,
delete "nanonstructure" and insert -- nanostructure --, therefor.

On Page 2, Item (56), under "OTHER PUBLICATIONS", Line 1,
delete "Naontubes" and insert -- Nanotubes --, therefor.

On Page 2, Item (56), under "OTHER PUBLICATIONS", Line 9,
delete "nanontubes," and insert -- nanotubes, --, therefor.

In Column 3, Line 46, delete "tioglycol," and insert -- thioglycol, --, therefor.

In Column 6, Line 41, delete "particles" and insert -- particles. --, therefor.

In Column 7, Line 23, delete "tioglycol," and insert -- thioglycol, --, therefor.

In Column 8, Lines 14-15, delete "single walled" and insert -- single-walled --, therefor.

Signed and Sealed this
Tenth Day of April, 2012

David J. Kappos
*Director of the United States Patent and Trademark Office*